United States Patent
Yang et al.

(10) Patent No.: US 11,362,860 B2
(45) Date of Patent: Jun. 14, 2022

(54) METHOD FOR DATA HAND-SHAKING BASED ON ETHERCAT PROTOCOL

(71) Applicant: Delta Electronics, Inc., Taoyuan (TW)

(72) Inventors: Bo-Yuan Yang, Taoyuan (TW); Tzu-Hao Chou, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/092,182

(22) Filed: Nov. 6, 2020

(65) Prior Publication Data
US 2021/0160093 A1 May 27, 2021

(30) Foreign Application Priority Data

Nov. 26, 2019 (CN) .......................... 201911173568.2

(51) Int. Cl.
*H04L 12/403* (2006.01)
*H04L 49/00* (2022.01)
*H04L 1/18* (2006.01)
*H04L 45/00* (2022.01)
*H04L 101/622* (2022.01)
*H04L 69/08* (2022.01)

(52) U.S. Cl.
CPC .......... *H04L 12/403* (2013.01); *H04L 1/1819* (2013.01); *H04L 45/22* (2013.01); *H04L 49/30* (2013.01); *H04L 61/6022* (2013.01); *H04L 69/08* (2013.01)

(58) Field of Classification Search
CPC ..... H04L 12/403; H04L 1/1819; H04L 45/22; H04L 49/30; H04L 61/6022; H04L 69/08
See application file for complete search history.

(56) References Cited

U.S. PATENT DOCUMENTS

| 10,554,522 | B2* | 2/2020 | Sawada ............... H04L 43/0847 |
| 2010/0306511 | A1 | 12/2010 | Mochizuki et al. |
| 2011/0184533 | A1* | 7/2011 | Maruyama ........ H04L 12/40032 700/3 |

(Continued)

OTHER PUBLICATIONS

Search Report dated Mar. 24, 2021 of the corresponding European patent application No. 20208762.3.

*Primary Examiner* — Kent Krueger
(74) *Attorney, Agent, or Firm* — Chun-Ming Shih; HDLS IPR Services (57) ABSTRACT

A method for data hand-shaking based on EtherCAT protocol is disclosed, the method is implemented by an EtherCAT slave device, and includes: receiving a data packet from a previous device; obtaining self-related data from or inserting feedback data to the data packet for generating a processed packet; transmitting the processed packet to a next device; receiving a returned packet from the next device; transmitting the returned packet to the previous device; performing a packet diversion procedure to at least one of the data packet, the processed packet and the returned packet for generating a backup packet, wherein at least part of the content of the backup packet is identical to the content of the data packet, the processed packet or the returned packet; analyzing the backup packet; and, filtering the backup packet for obtaining designated application data with respect to other EtherCAT slave devices.

10 Claims, 8 Drawing Sheets

(56) References Cited

U.S. PATENT DOCUMENTS

| | | | | |
|---|---|---|---|---|
| 2014/0325102 A1* | 10/2014 | Opitz | .................... | H04L 1/0083 |
| | | | | 710/110 |
| 2015/0293871 A1* | 10/2015 | Rahamim | ............. | H04L 12/437 |
| | | | | 710/106 |
| 2019/0305977 A1* | 10/2019 | Ueda | ................... | H04L 12/1868 |

* cited by examiner

METHOD FOR DATA HAND-SHAKING BASED ON ETHERCAT PROTOCOL

BACKGROUND OF THE INVENTION

1. Field of the Invention

The invention relates to a method for data hand-shaking, and in particularly to a method for data hand-shaking based on EtherCAT protocal.

2. Description of Related Art

Ethernet for Control Automation Technology (EtherCAT) is a protocol which is implemented based on Ethernet. According to the high speed and real-time communication capability, EtherCAT is getting more and more important in the field of industrial automation which pursues extremely accurate.

Figure 1:
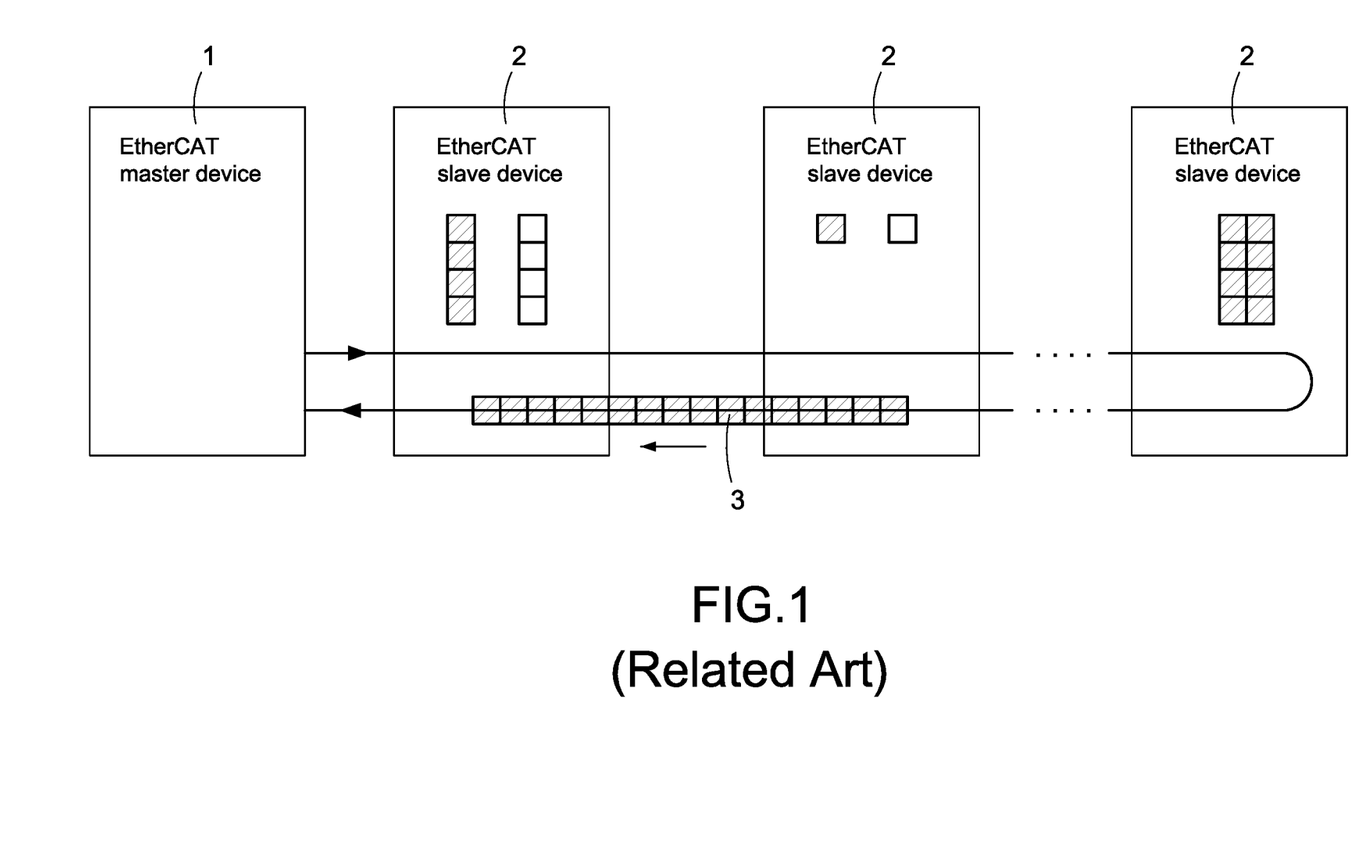
FIG. 1 is a schematic diagram showing packets transmission based on EtherCAT.

Please refer to FIG. 1, which is a schematic diagram showing packets transmission based on EtherCAT. As shown in FIG. 1, an EtherCAT bus may include one EtherCAT master device 1 and one or more EtherCAT slave devices 2 (respectively referred to as the master device 1 and the slave device 2 hereinafter) according to different network topology adopted. An EtherCAT packet 3 (referred to as the packet 3 hereinafter) will be delivered to all of the slave devices 2 on the EtherCAT bus after being sent from the master device 1. After receiving the packet 3, each of the slave devices 2 may retrieve self-related data from the packet 3 or insert feedback data needed to be replied into the packet 3, and then transmit such packet 3 to a next slave device 2 which is connected afterward. After being delivered to last one of the multiple slave devices 2 on the bus, the packet 3 will be then returned to the master device 1 through all of the slave devices 2 that have been passed, and a communication cycle will be finished after the packet 3 returns to the master device 1.

Under a standard strucutre of EtherCAT protocol, each controller of each slave device 2 can only retrieve the self-related data from the packet 3 during a single communication cycle, but they are incapable of obtaining additional data with respect to other slave device(s) 2 at the same time. In other words, each slave device 2 cannot obtain all necessary data for operation during one single communication cycle. In conclusion, asynchronization problems will be caused when performing lower layer applications.

For example, the EtherCAT bus may be applied on a server driver of a processing equipment. The processing quipment requires multiple shafts thereon to be synchronized when processing (wherein, each shaft is respectively corresponding to one EtherCAT slave device 2), if any of the shafts cannot obtain other shaft's data (i.e., the shaft(s) needed to be operated synchronously), then the multiple shafts will be incapable of operating synchronously due to the time interval before control commands respectively arrive each of the slave devices 2 after being sent out from the master device 1. Therefore, components of the processing quipment may drag each other while working, therefore, energy of the processing equipment will be wasted, temperature of the processing equipment will be raised, lifetime of the processing equipment will be reduced, and processing quality of the processing quipment will be affected.

By the teaching or suggestion of curreht technologies, a master device has to send another command packet(s) to each shaft in a next communication cycle for each shaft to obtain necessary data with respect to related shaft(s). Then, the processing equipment may perform sychronized operation after all of the shafts obtain their necessary data. Therefore, the shafts of the processing equipment can work accurately and synchronously. However, such operation may extend the whole processing time, reduce the processing speed, and raise the processing cost. Besides, different command packets are used and sent at different communication cycles, a risk of getting inaccurate data may be noticed.

SUMMARY OF THE INVENTION

The object of the present invention is to provide a method for data hand-shaking based on EtherCAT protocol, for an EtherCAT slave device to simultaneously obtain self-related data as well as data with respect to other slave devices without sending additional command packet, and without amending the standard structure of EtherCAT protocol.

In one of the exemplary embodiments, the method of the present invention is implemented by an EtherCAT slave device, and includes: receiving a data packet from a previous device; obtaining self-related data from or inserting feedback data to the data packet for generating a processed packet; transmitting the processed packet to a next device; receiving a returned packet from the next device; transmitting the returned packet to the previous device; performing a packet diversion procedure to at least one of the data packet, the processed packet and the returned packet for generating a backup packet, wherein at least part of the content of the backup packet is identical to the content of the data packet, the processed packet, or the returned packet; analyzing the backup packet; and, filtering the backup packet for obtaining designated application data of other EtherCAT slave devices.

In comparison with related art, the present invention may help an EtherCAT slave device to simultaneously obtain self-related data as well as data with respect to other slave devices without sending additional command packets, without affecting the content of the received/transmitted packets, under an unchanged EtherCAT protocol. Besides, by using the technical solution of packet diversion procedure, an EtherCAT slave device may simultaneously obtain the self-related data as well as the data with respect to other slave devices within one single communication cycle. Therefore, multiple EtherCAT slave devices under such structure may accurately perform synchronized operations when being applied in lower layer applications.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

The present invention discloses a method for data handshaking based on EtherCAT (Ethernet for Control Automation Technology) protocal, the method for data hand-shaking base on EtherCAT protocal of the present invention will be referred to as the hand-shaking method hereinafter. The hand-shaking method is mainly applied by one or more slave devices on an EtherCAT bus, so the multiple slave devices may achieve data synchronization with each other without additional command packets and interference from an EtherCAT master device. Besides, the data synchronization may also be achieved within one single communication cycle in a part of the exemplary embodiments, therefore, synchronization rate can be exetremly improved without affecting communication speed of the slave devices.

Figure 2:
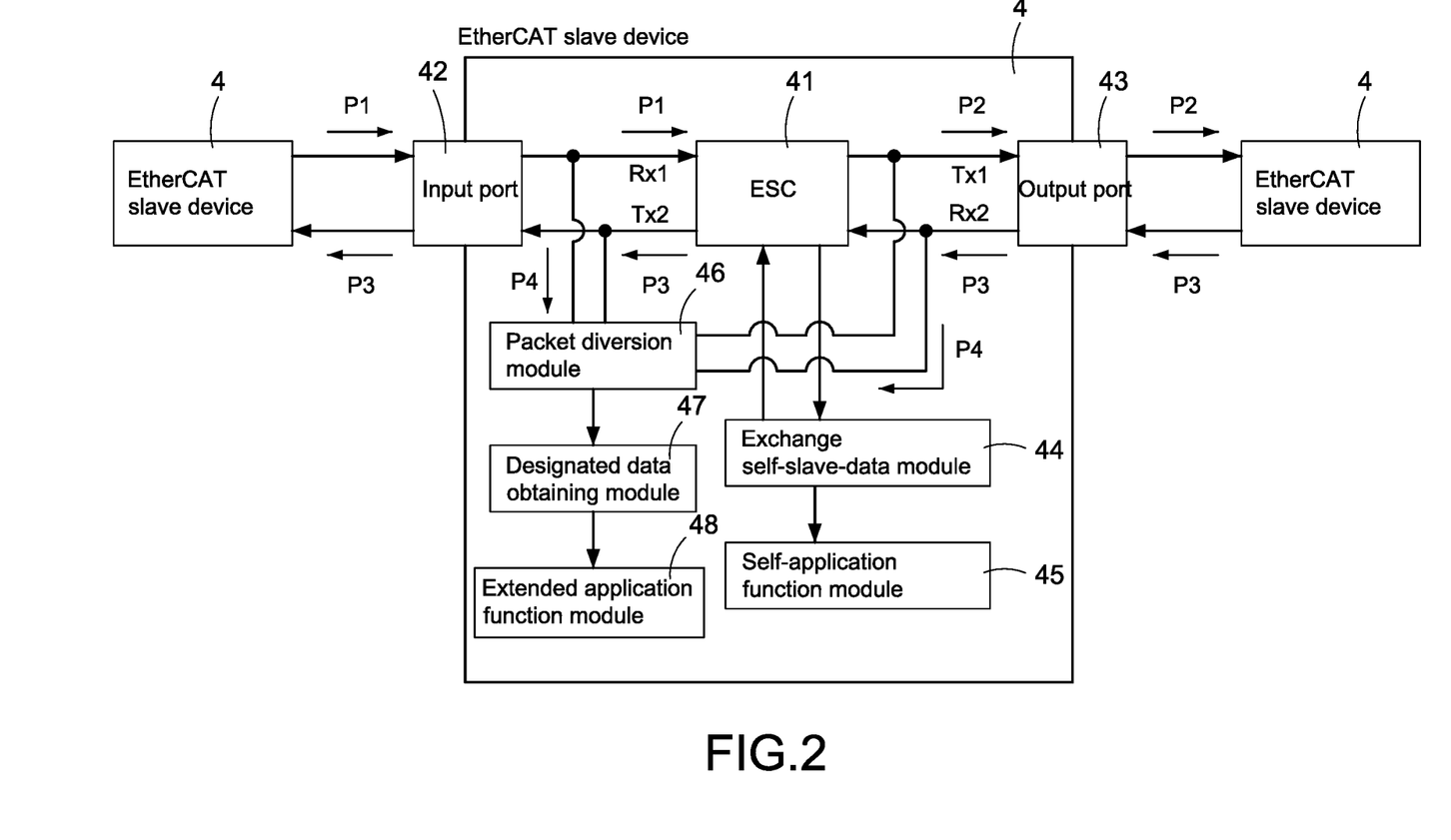
FIG. 2 is a block diagram of an EtherCAT slave device according to a first embodiment of the present invention.

Refers to FIG. 2, which is a block diagram of an EtherCAT slave device according to a first embodiment of the present invention. FIG. 2 discloses multiple EtherCAT slave devices 4 (referred to as the slave device 4 hereinafter), the multiple slave devices 4 are in series connection with each other, for delivering EtherCAT packets.

As mentioned, one of the technical features of the present invention is that, without amending and changing the standard structure of EtherCAT protocol, multiple slave devices 4 may achieve data synchronization without using additional command packets. Further, multiple slave devices 4 may achieve data synchronization within one single communication cycle under specific conditions without the interference of an EtherCAT master device (referred to as the master device hereinafter).

In particular, the master slave (not shown) is in series connection with the multiple slave device 4 under the standard structure of EtherCAT protocol, and is the first device arranged on the EtherCAT bus. During a packet transmission procedure, the master device sends an EtherCAT packet to each slave device 4 on the EtherCAT bus in an order for each slave device 4 to retrieve self-related data from the EtherCAT packet or to insert feedback data needed to be replied to the master device into the EtherCAT packet. During a packet returning procedure, a last one of the multiple slave devices 4 on the EtherCAT bus transmits a processed EtherCAT packet forward, so the processed EtherCAT packet will eventually returns to the master device through all slave devices 4 that has been passed before. In general, the time duration from one EtherCAT packet being sent out from the master device to the EtherCAT packet (i.e., the processed EtherCAT packet) being returned to same master device, is defined as one communication cycle.

As shown in FIG. 2 for details, a slave device 4 mainly includes an EtherCAT slave controller (referred to as the ESC hereinafter) 41, an input port 42 and an output port 43, wherein the ESC 41 is connected with the input port 42 and the output port 43. In one embodiment, the slave device 4 connects a previous data processing device (such as a master device or other slave device, not shown in the drawing) through the input port 42, and connects a next slave device 4 through the output port 43 on the EtherCAT bus.

During a packet transmission procedure, the slave device 4 may receive a data packet P1 through a previous data processing device (e.g., previous slave device 4) through a first receiving route. The slave device 4 processes the received data packet P1 by the ESC 41 therein for transforming the data packet P1 into a processed data packet P2, and then transmits the processed data packet P2 to a next slave device 4 through a first transmission route on the EtherCAT bus.

During a packet returning procedure, the slave device 4 may receive a returned packet P3 from the next slave device 4 through a second receiving route, and then directly transmits the returned packet P3 to the previous data processing device through a second transmission route.

As shown in FIG. 2, the first receiving route at least includes a connection circuit (first connection circuit) between previous data processing device and the input port 42, and includes a first receiving circuit (Rx1) between the input port 42 and the ESC 41, the first transmission route at least includes a first transmission circuit (Tx1) between the ESC 41 and the output port 43, and includes a connection circuit (second connection circuit) between the output port 43 and a next slave device 4, the second receiving route at least includes a connection circuit (third connection circuit) between the next slave device 4 and the output port 43, and includes a second receiving circuit (Rx2) between the output port 43 and the ESC 41, the second transmission route at least includes a second transmission circuit (Tx2) between the ESC 41 and the input port 42, and includes a connection circuit (fourth connection circuit) between the input port 42 and previous data processing device 4.

One of the technical features of the present invention is that the slave device 4 may perform a packet diversion procedure to the received/transmitted EtherCAT packets on at least one of the first receiving route, the first transmission route, the second receiving route and the second transmission route, therefore, necessary data related to other slave device 4 can be retrieved by the slave device 4 directly from a packet generated by the packet diversion procedure. As a result, each slave device 4 may simultaneously obtain self-related data as well as necessary data related to other slave device(s) 4 without generating and sending additional command packet(s). For example, a slave device 4 may simultaneously obtains self-related data which records information about itself and necessary data with respect to synchronization operation of one or more slave devices 4 which has been designated to be synchronized with, directly from the packet generated by the packet diversion procedure, and without sending/receiving additional command packet(s). Besides, each of the slave devices 4 may simultaneously obtain the self-related data as well as data related to other slave device 4 within one single communication cycle, so as to achieve the purpose of accurate synchronization.

Figure 3:
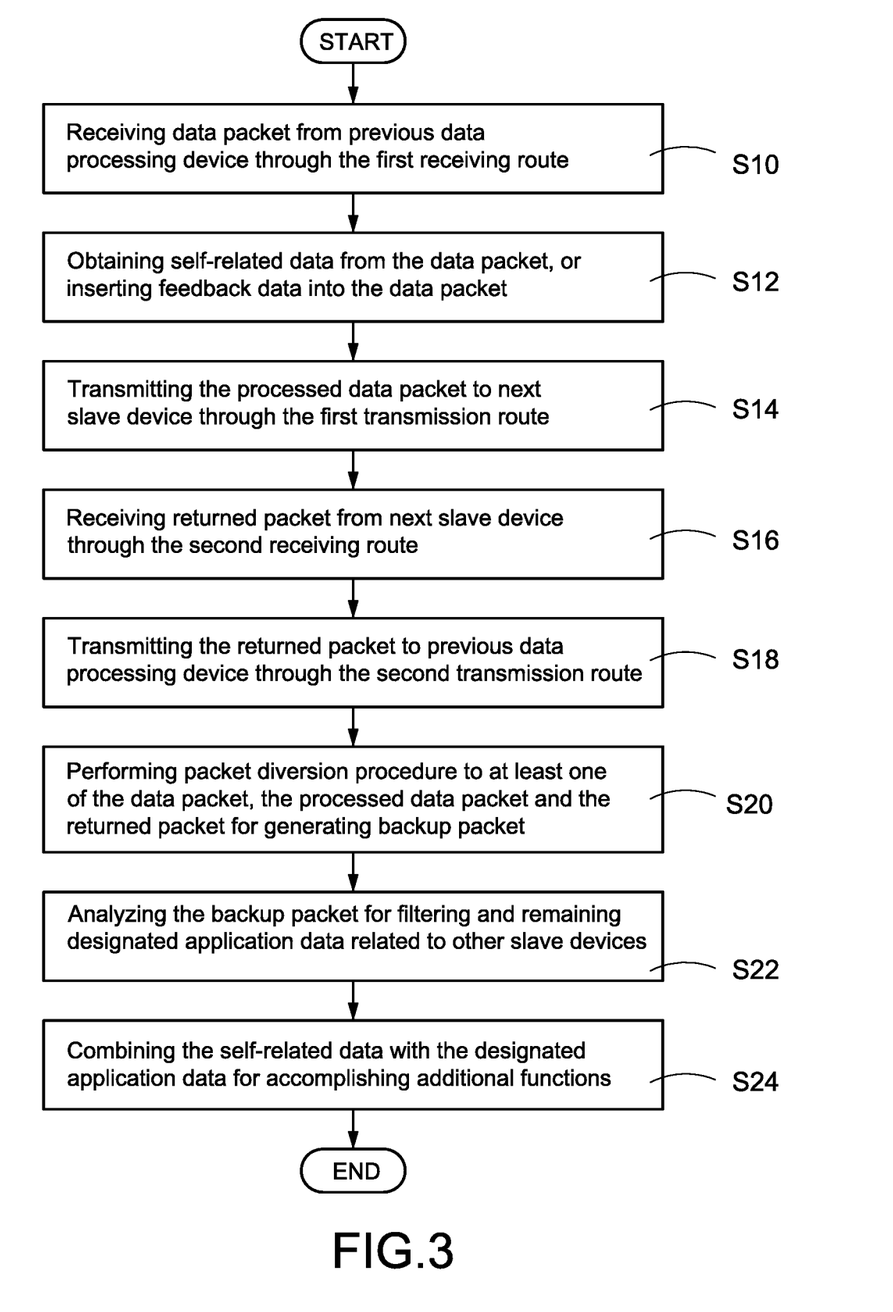
FIG. 3 is a hand-shaking flowchart according to a first embodiment of the present invention.

Refers to FIG. 3, which is a hand-shaking flowchart according to a first embodiment of the present invention. FIG. 3 discloses each substantive step of the hand-shaking method, and the hand-shaking method is mainly implemented by one or more slave devices 4 as disclosed in FIG. 2.

First, the slave device 4 receives a data packet P1 from previous data processing device connected to the input port 42 of the slave device 4 through the first receiving route (step S10). In particular, the slave device 4 in step S10 uses the input port 42 to receive the data packet P1 from previous data processing device through external circuit, and then uses the ESC 41 to receive the data packet P1 from the input port 42 through internal circuit. In other words, the first receiving route includes a connection circuit (first connection circuit) between the previous data processing device and the input port 42, and also includes the first receiving circuit (Rx1) of the ESC 41 (which connects the input port 42 and the ESC 41).

After the step S10, the ESC 41 may obtain self-related data which records information about the slave device 4 itself from the data packet P1, or inserts feedback data which needs to be replied into the data packet P1, for transforming the data packet P1 into a processed data packet P2 (step S12). After the processed data packet P2 is generated, the slave device 4 then transmits the processed data packet P2 to a next slave device 4 connected to the output port 43 of the slave device 4 through the first transmission route (step S14).

In particular, the slave device 4 in step S14 uses the ESC 41 to transmit the processed data packet P2 to the output port 43 through internal circuit, and then uses the output port 43 to transmit the processed data packet P2 to a next slave device 4 through external circuit. In other words, the first transmission route includes the first transmission circuit (Tx1) of the ESC 41 (which connects the ESC 41 and the output port 43), and also includes a connection circuit (second connection circuit) between the output port 43 and the next slave device 4.

During a packet returning procedure, the slave device 4 receives a returned packet P3 from the next slave device 4 connected to the output port 43 of the slave device 4 through the second receiving route (step S16). In this embodiment, the ESC 41 of the slave device 4 will not process the returned packet P3, instead, the ESC 41 directly transmits the returned packet P3 to previous data processing device connected to the input port 42 of the slave device 4 through the second transmission route (step S18). In the end of the packet returning procedure, the returned packet P3 will be returned to a master device (not shown) on the EtherCAT bus.

In one embodiment, the slave device 4 in step S16 uses the output port 43 to receive the returned packet P3 from the next slave device 4 through external circuit, and uses the ESC 41 to receive the returned packet P3 from the output port 43 through internal circuit. In other words, the second receiving route includes a connection circuit (third connection circuit) between next slave device 4 and the output port 43, and also includes the second receiving circuit (Rx2) of the ESC 41 (which connects the output port 43 and the ESC 41). The slave device 4 in step S18 uses the ESC 41 to transmit the returned packet P3 to the input port 42 through internal circuit, and uses the input port 42 to transmit the returned packet P3 to previous data processing device through external circuit. In other words, the second transmission route includes the second transmission circuit (Tx2) of the ESC 41 (which connects the ESC 41 and the input port 42), and also includes a connection circuit (fourth connection circuit) between the input port 42 and previous data processing device.

One of the technical features of the present invention is that the slave device 4 may perform a packet diversion procedure to at least one of the data packet P1 (which is transmitted in the step S10), the processed data packet P2 (which is transmitted in the step S14) and the returned packet P3 (which is transmitted in the step S16 or the step S18), so as to generate a backup packet P4 based on the data packet P1, the processed data packet P2 or the returned packet P3 (step S20).

In one embodiment, the slave device 4 is to retrieve a part of the content from the data packet P1, the processed data packet P2 or the returned packet P3 in the step S10, the step S14, the step S16 or the step S18, and then generates the backup packet P4 according to the retrieved content. In this embodiment, a part of the content of the backup packet P4 is identical to the content of the data packet P1, the processed data packet P2 or the returned packet P3.

In another embodiment, the slave device 4 duplicates the data packet P1, the processed data packet P2 or the returned packet P3 directly for generating the backup packet P4 upon the first receiving route, the first transmission route, the second receiving route or the second transmission route. In this embodiment, the content of the backup packet P4 is entirely identical to the content of the data packet P1, the processed data packet P2 or the returned packet P3.

After the step S20, the slave device 4 analyzes the backup packet P4 through the ESC 41 for filtering the content of the backup packet P4 and remaining designated application data related to other slave devices on the EtherCAT bus (step S22). After the step S22, the slave device 4 can not only perform self function according to the self-related data obtained from the step S12, but also can combine the self-related data with the designated application data obtained from the step S22 for accomplishing additional functions (step S24). As a result, the efficiency of synchronization operation among multiple slave devices 4 on the EtherCAT bus can be improved.

It should be mentioned that, the single communication cycle discussed in the present invention is indicating a time duration that a packet being sent out from a master device on an EtherCAT bus, then passing through all of the slave devices 4 on the same EtherCAT bus, and eventually being returned to the master device. In one embodiment, the aforementioned step S10 to the step S24 are done in one single communication cycle. In another embodiment, the aforementioned step S10 to the step S18 as well as the step S20 to the step S24 are respectively completed in two or more than two communication cysles.

Please refer back to FIG. 2. The slave device 4 further includes an exchange self-slave data module 44, self-application function module 45, packet diversion module 46, designated data obtaining module 47 and extended application function module 48. In one embodiment, the above modules 44-48 can be implemeted by hardware, such as an integrated circuit (IC). In another emobidment, the above modules 44-48 can be implemeted by firmware being pre-edited and recorded in chips, but not limited.

In one embodiment, the slave device 4 of the present invention may be implemented by a field programmable gate array (FPGA), an application specific integrated circuit (ASIC) or a microcontroller unit (MCU). A user of EtherCAT bus may accomplish each function of each module 44-48 through firmware, and records the firmware to FPGA, ASIC or MCU, so as to perform the hand-shaking method of the present invention by using the firmware as well as the ESC 41 in the chips.

More specific, the exchange self-slave data module 44 is used to obtain data from the ESC 41 retrieving from the the data packet P1. Besides, the slave device 4 may obtain such data from the exchange self-slave data module 44 through a communication interface of a digital signal processor (DSP), therefore, the self-application function module 45 may accomplish the slave device's 4 lower layer function according to the obtained data.

For example, the slave device 4 of the present invention can be applied in drivers of panel testers, computer numerical controllers (CNCs), multiple axes robots, etc., so as to control one or more axes of such devices. According to aforementioned data, each slave device 4 may respectively execute corresponding operation that has been designated to each driver by the self-application function module 45. In one embodiment, such data can be, for example but not limited to, position feedback data, speed feedback data or torque feedback data of each driver with respect to each slave device 4.

In the present invention, the packet diversion module 46 may be arranged on the first receiving route, the first transmission route, the second receiving route or the second transmission route.

In the embodiment shown in FIG. 2, the packet diversion module 46 is arranged inside the slave device 4, i.e., the packet diversion module 46 is arranged on the first receiving circuit (Rx1), the first transmission circuit (Tx1), the second receiving circuit (Rx2) or the second transmission circuit (Tx2), so that the packet diversion module 46 can retrieve content of such packets (including the data packet P1, the processed data packet P2 and the returned packet P3) or duplicate such packets P1-P3 directly for generating the backup packet P4. However, in another embodiment, the packet diversion module 46 can also be arranged outside the slave device 4 (detailed discussed in the following).

The designated data obtaining module 47 obtains the backup packet P4 from the packet diversion module 46, and then obtains the designated application data with respect to other slave devices 4 from the backup packet P4 according to an initial setting parameter of the slave device 4.

More specific, a user may preset the initial setting parameter of the slave device 4 before the slave device 4 is activated, so as to designate one or more other slave devices 4 that have cooperation relationship with this slave device 4 (e.g., one or more slave devices 4 needed to be operated synchronously), and also designates the necessary data type.

For an instance, if one slave device 4 is implemented in a gantry main shaft of a panel tester, a user may set the initial setting parameter for this slave device 4, so that the designated data obtaining module 47 of the slave device 4 may obtain the designated application data of other slave device 4 which is corresponding to a gantry slave shaft from the backup packet P4, such as position feedback data, speed feedback data, torque feedback data, etc., but not limited thereto.

In this embodiment, the slave device 4 can further obtain the designated application data from the designated data obtaining module 47 through the communication interface of the DSP. Therefore, the extended application function module 48 can combine the self-related data of the slave device 4 with the designated application data of other slave devices 4 for further operation, so as to improve the efficiency of synchronization operation among multiple slave devices 4, and to be capable of extended applications (such as real-time controlling input points/output points among multiple slave devices 4). In such a matter, the present invention may assist multiple slave devices 4 which have cooperation relationship with each other to accomplish accurately synchronization operation.

It should be mentioned that, if the packet diversion module 46 is arranged on the first receiving circuit (Rx1) or the first transmission circuit (Tx1), the backup packet P4 obtained and generated by the packet diversionmodule 46 will not include data of the next slave device 4 connected to the output port 43 (which is arranged behind this slave device 4 on the EtherCAT bus) because the next slave device 4 has not yet written its feedback data into the data packet P1 or the processed data packet P2. In other words, if a slave device 4 is designated to obtain necessary data related to one or more slave devices 4 arranged behind, the packet diversion module 46 of this slave device 4 cannot be implemented on the first receiving circuit (Rx1) or the first transmission circuit (Tx1), and can only be implemented on the second receiving circuit (Rx2) or the second transmission circuit (Tx2).

According to the standard structure of EtherCAT protocol, the ESC 41 will not process the returned packet P3, and the returned packet P3 has already included all the feedback data from all the slave devices 4 on the EtherCAT bus. As a result, no matter a slave device 4 has to perform synchronization operation with one or more previous slave devices 4 or with one or more slave devices 4 arranged behind, the packet diversion module 46 of this slave device 4 can be implemented directly on the second receiving circuit (Rx2) and the second transmission circuit (Tx2).

Figure 4:
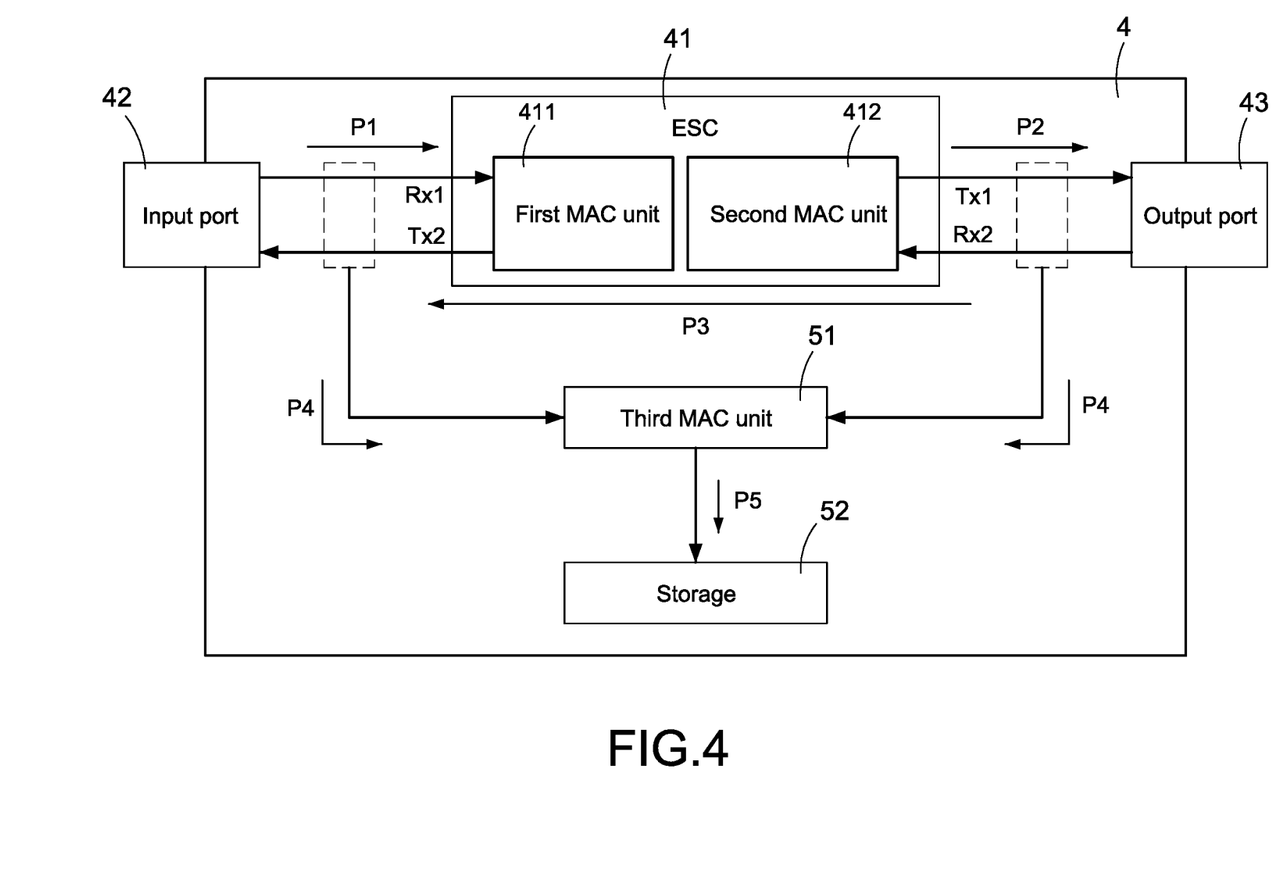
FIG. 4 is a block diagram of an EtherCAT slave device according to a second embodiment of the present invention.

FIG. 4 is a block diagram of an EtherCAT slave device according to a second embodiment of the present invention. As discussed above, the slave device 4 in the exemplary embodiments can be implemented at least by FPGA, ASIC or MCU. In the embodiment shown in FIG. 4, the handshaking method of the present invention is written as firmware and recorded in an FPGA, so as to implement the aforementioned slave device 4 through the FPGA, but not limited thereto.

As disclosed in FIG. 4, the ESC 41 is arranged with a first MAC (media access control) unit 411 and a second MAC unit 412. During a packet transmission procedure, a previous data processing device (can be a master device or a slave device 4) can transmit the data packet P1 to the first MAC unit 411, so that the ESC 41 may receive the data packet P1. After retrieving the self-related data from the data packet P1 or inserting the feedback data into the data packet P1, and generating the processed data packet P2, the ESC 41 may transmit the processed data packet P2 to an address assigned and used currently by a next slave device 4 connected thereto through the second MAC unit 412.

During a packet returning procedure, the ESC 41 of the slave device 4 may receive the returned packet P3 from the next slave device 4 through the second MAC unit 412, and then transmit this returned packet P3 to an address assigned and used currently by previous data processing device (can be a master device or a slave device) through the first MAC unit 411, so as to complete the packet returning procedure.

It should be mentioned that, if a slave device 4 is the last slave device 4 on the EtherCAT bus, the ESC 41 of this slave device 4 don't have to transmit packets afterward, so that the arrangement of the second MAC unit 412 is only an option for this slave device 4. In particular, after such processed data packet P2 is generated, this slave device 4 may regard this processed data packet P2 as the returned packet P3 directly, and then transmits the returned packet P3 to an address assigned and used currentlt by previous data processing device (can be a master device or a slave device) through the first MAC unit 411 of the ESC 41, so as to initiate the packet returning procedure.

One of the technical features of the present invention should be mentioned is that the packet diversion module 46 can be arranged with a third MAC unit 51 which is different from the first MAC unit 411 and the second MAC unit 412.

In a first embodiment, the packet diversion module 46 is implemented on the first receiving circuit (Rx1) of the ESC 41. When executing the packet diversion procedure, a previous data processing device transmits the data packet P1 simultaneously to the first MAC unit 411 of the ESC 41 and the third MAC unit 51 of the packet diversion module 46 through the input port 42. Therefore, the packet diversion module 46 regards the data packet P1 received by the third MAC unit 51 as the backup packet P4, so as to complete the packet diversion procedure.

In a second embodiment, the packet diversion module 46 is implemented on the first transmission circuit (Tx1) of the ESC 41. When executing the packet diversion procedure, the ESC 41 transmits the processed data packet P2 simultaneously to the address used by a next slave device 4 and the third MAC unit 51 of the packet diversion module 46 by the second MAC unit 412. Therefore, the packet diversion module 46 regards the processed data packet P2 received by the third MAC unit 51 as the backup packet P4, so as to complete the packet diversion procedure.

In a third embodiment, the packet diversion module 46 is implemented on the second receiving circuit (Rx2) of the ESC 41. When executing the packet diversion procedure, the next slave device 4 transmits the returned packet P3 simultaneously to the second MAC unit 412 of the ESC 41 and the third MAC unit 51 of the packet diversion module 46 through the output port 43. Therefore, the packet diversion module 46 regards the returned packet P3 received by the third MAC unit51 as the backup packet P4, so as to complete the packet diversion procedure.

In a fourth embodiment, the packet diversion module 46 is implemented on the second transmission circuit (Tx2) of the ESC 41. When executing the packet diversion procedure, the ESC 41 transmits the returned packet P3 simultaneously to the address used by previous data processing device and the third MAC unit 51 of the packet diversion module 46 by the first MAC unit 411. Therefore, the packet diversion module 46 regards the returned packet P3 received by the third MAC unit 51 as the backup packet P4, so as to complete the packet diversion procedure.

In an embodiment, the aforementioned packet transmission procedure, packet returning procedure and packet diversion procedure are completed in one single communication cycle. In another embodiment, the packet transmission procedure and the packet returning procedure are completed in one single communication cycle, and the packet diversion procedure is completed in another communication cycle.

It is worth saying that, after obtaining/generating the backup packet P4, the packet diversion module 46 can save the backup packet P4 directly to a storage 52 inside the slave device 4. Also, the packet diversion module 46 can only save the designated application data to the storage 52 after the backup packet P4 has been filtered and the designated application data has been obtained from the backup packet P4 by the designated data obtaining module 47.

As discussed above, the slave device 4 can also be implemented by using ASIC or MCU. In this embodiment, the packet diversion module 46 can be arranged on any of the aforementioned routes. Before receiving or transmitting such data packet P1, processed data packet P2 or returned packet P3, the ESC 41 may directly duplicate each of the packets P1-P3 and store to the storage 52 for directly generating the backup packet P4. However, the above descriptions are only parts of the exemplary embodiments, but not limited thereto.

As mentioned above, the packet diversion procedure of the present invention can be implemented on the first receiving route, the first transmission route, the second receiving route or the second transmission route. As shown in FIGS. 2 & 4, the packet diversion module 46 can be implmeneted inside of the slave device 4 by way of firmware. In particular, the packet diversion module 46 in FIGS. 2 & 4 can be arranged on the first receiving circuit (Rx1) of the first receiving route, the first transmission circuit (Tx1) of the first transmission route, the second receiving circuit (Rx2) of the second receiving route, or the second transmission circuit (Tx2) of the second transmission route. However, the packet diversion procedure can also be implemented outside of the slave device 4 by way of hardware.

Figure 5:
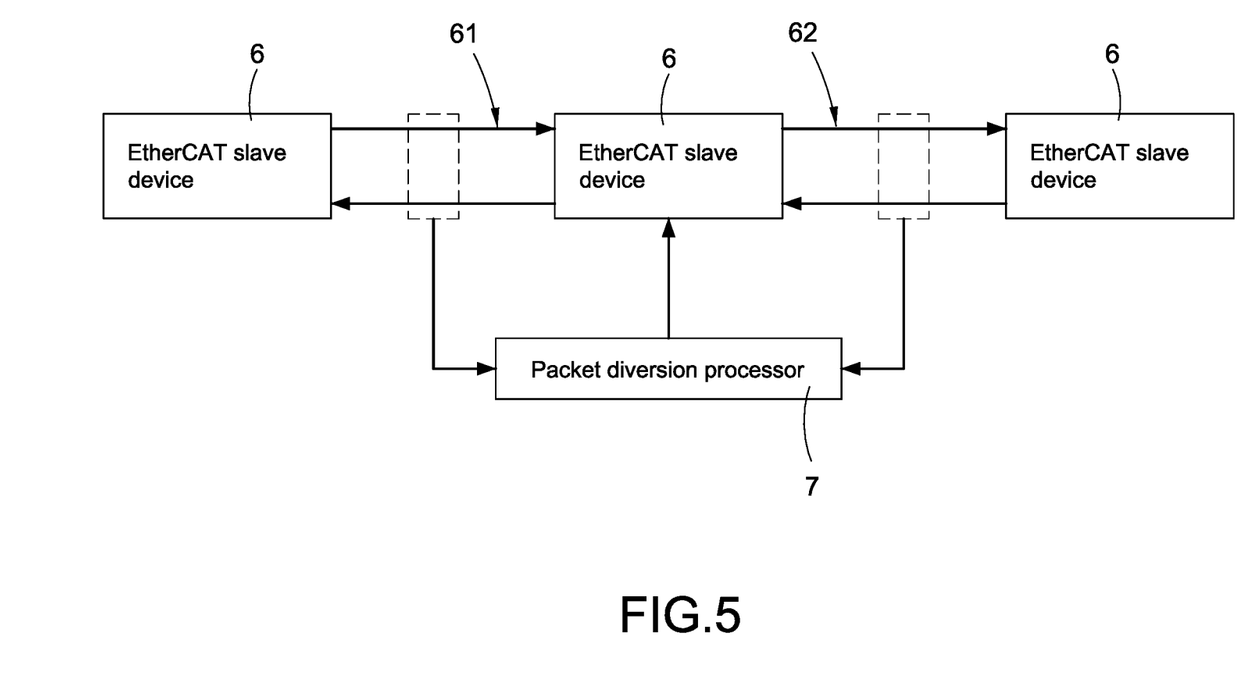
FIG. 5 is a schematic diagram showing a structure for a packet diversion procedure according to a first embodiment of the present invention.

FIG. 5 is a schematic diagram showing a structure for a packet diversion procedure according to a first embodiment of the present invention. In the embodiment shown in FIG. 5, the packet diversion procedure is arranged outside of an EtherCAT slave device 6 (referred to as the slave device 6 hereinafter) and is implemented by a real chip (referred to as a packet diversion processor 7 hereinafter). As shown in FIG. 5, the packet diversion processor 7 can be, particularly, arranged directly on a printed circuit board (PCB, not shown in the drawing), and connected to the slave device 6 which needs to perform the packet diversion procedure through the PCB.

It should mentioned that, if there are a plurality of slave devices 6 needs the packet diversion procedure, each of the slave devices 6 may be respectively arranged with an individual packet diversion processor 7, however, one packet diversion processor 7 can also be electrically connected with multiple slave devices 6 for performing the packet diversion procedure for all of the multiple slave devices, but not limited thereto.

As shown in FIG. 5, the packet diversion processor 7 can be connected to a first connection circuit 61 between the slave device 6 and previous data processing device (e.g., a master device or other slave device 6), wherein the first connection circuit 61 is a part of the aforementioned first receiving route, or a part of the aforementioned second transmission route. Also, the packet diversion processor 7 in this embodiment can also be connected to a second connection circuit 62 between the slave device 6 and next slave device 6, wherein the second connection circuit 62 is a part of the aforementioned first transmission route, or a part of the aforementioned second receiving route.

In this embodiment, the packet diversion processor 7 has been written with firmware which can implement the handshaking method of the present invention, so the packet diversion processor 7 is capable of performing the aforementioned packet diversion procedure for the connected slave device 6, and the packet diversion processor 7 can then generate the backup packet P4, and obtains the designated application data with respect to other slave devices 6 from the backup packet P4 according to the packet diversion procedure. The further description of the applied handshaking method is omitted there.

Figure 6:
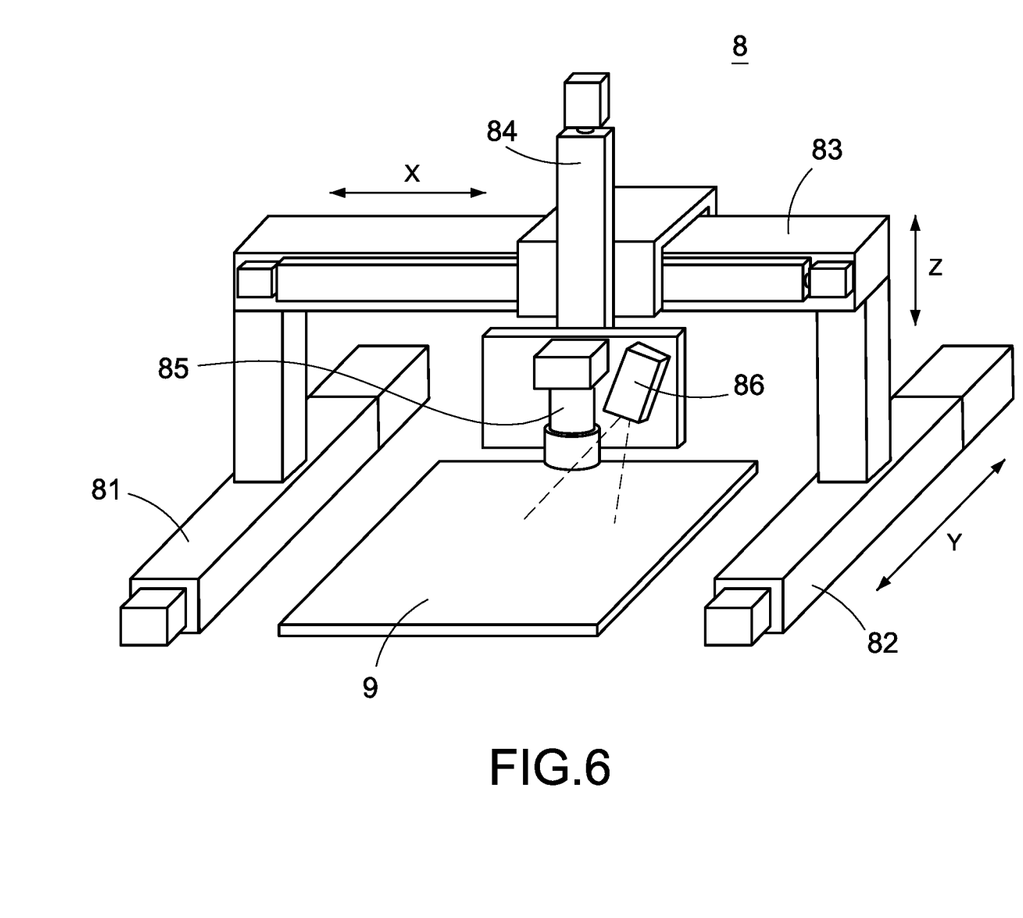
FIG. 6 is a schematic diagram of a panel tester according to a first embodiment of the present invention.
Figure 7:
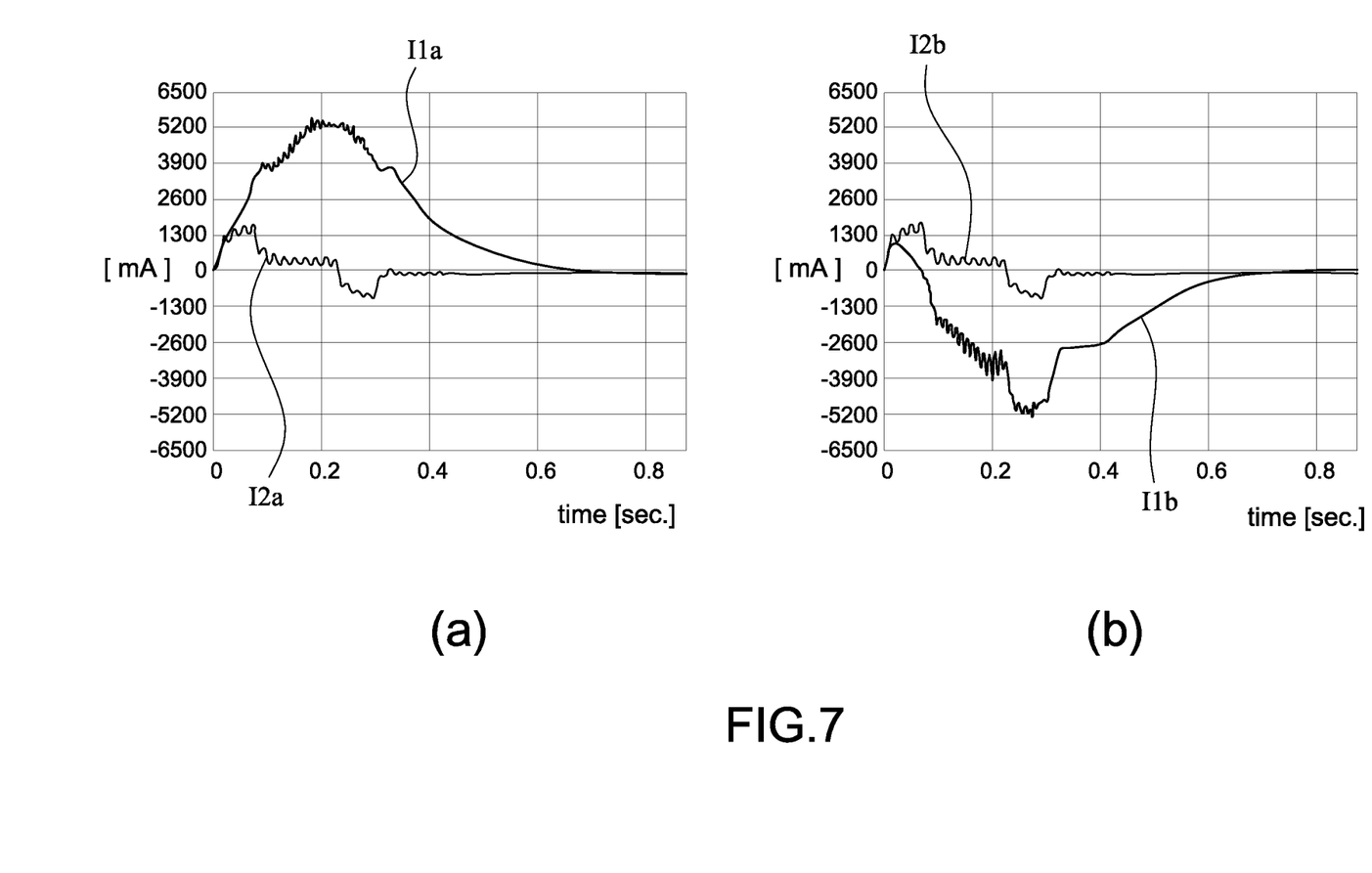
FIG. 7 is a schematic diagram showing gantry shaft current according to a first embodiment of the present invention.

Please refer to FIG. 6 and FIG. 7, wherein FIG. 6 is a schematic diagram of a panel tester according to a first embodiment of the present invention, FIG. 7 is a schematic diagram showing gantry shaft current according to a first embodiment of the present invention.

As shown in FIG. 6, a panel tester 8 includes a gantry main shaft 81 and a gantry slave shaft 82 which can be controlled to move along a Y-axis direction of the panel tester 8. A parallel shaft 83 which is parallel to an X-axis direction of the panel tester 8 is arranged above the gantry main shaft 81 and the gantry slave shaft 82, and a vertical shaft 84 which is parallel to a Z-axis direction of the panel tester 8 is further arranged on the parallel shaft 83. One end of the vertical shaft 84 is arranged with an image sensor 85 for capturing an image of a tested panel 9, and a side of the vertical shaft 84 is arranged with a light emitter 86 for improving the quality of the captured image.

In one embodiment, the drivers of both the gantry main shaft 81 and the gantry slave shaft 82 are implemented respectively by different EtherCAT slave devices (such as the above discussed slave device 4 in FIG. 2), in other words, two slave devices 4 are respectively controlling the operation of the gantry main shaft 81 and the gantry slave shaft 82. Because the gantry main shaft 81 and the gantry slave shaft 82 have to work synchronously for leading the image sensor 85 as well as the light emitter 86 to move along the Y-axis direction, the testing quality of the panel tester 8 will be extremely affected if each of the slave devices 4 cannot obtain the data related to other slave device 4 and finish an operation compensation during one single communication cycle without sending additional command packets.

FIG. 7(*a*) discloses current variations of the gantry main shaft 81 while it is operating, including a first main shaft current I1*a* without applying the hand-shaking method of the present invention, and a second main shaft current I2*a* after applying the hand-shaking method of the present invention. FIG. 7(*b*) discloses current variations of the gantry slave shaft 82 while it is operating, including a first slave shaft current I1*b* without applying the hand-shaking method of the present invention, and a second slave shaft current I2*b* after applying the hand-shaking method of the present invention.

As discussed, the slave device 4 for controlling the gantry main shaft 81 cannot obtain the data with respect to other slave device 4 that controls the gantry slave shaft 82 without applying the hand-shaking method of the present invention, and vice versa. When a superior controller of the panel tester 8 (not shown in the FIGS.) controls the gantry main shaft 81 as well as the gantry slave shaft 82 to operate, the control commands sent from the controller may have a time interval while they respectively arrive the gantry main shaft 81 and the gantry slave shaft 82. As a result, the operation speed of the gantry main shaft 81 will exceed the operation of the gantry slave shaft 82. As shown in FIG. 7, the gantry slave shaft 82 has not yet moved when the gantry main shaft 81 starts moving, so the gantry main shaft 81 will drag the gantry slave shaft 82 when it is moving, and the first main current I1*a* being generated thereupon will be larger. On the other hand, the gantry slave shaft 82 starts to move after being dragged by the gantry main shaft 81, so its output will be against the gantry main shaft 81, and the first slave current I1*b* being generated thereupon will be opposite to the direction of the first main current I1*a*.

According to above description, without applying the hand-shaking method of the present invention, the gantry main shaft 81 and the gantry slave shaft 82 cannot accurately perform synchronization operation. As a result, the panel tester 8 has to spend more energy during testing, the test quality of the panel tester 8 will be reduced due to dragging and shaking caused by the gantry main shaft 81 and the gantry slave shaft 82, and the lifetime of the panel tester 8 will be affected eventually.

After applying the hand-shaking method of the present invention, both of the slave devices 4 for controlling the gantry main shaft 81 and the slave device 4 for controlling the gantry slave shaft 82 can respectively obtain the data with respect to other slave device 4 within one single communication cycle without additional command packets.

As a result, each of the slave devices 4 can finish operation compensation right after receiving a control command from the controller. For example, the slave device 4 for controlling the gantry main shaft 81 may obtain the data related to other slave device 4 which is in charge of the gantry slave shaft 82 (such as position feedback data, speed feedback data or torque feedback data of the gantry slave shaft 82) before operating, so that it can adjust the content of a control command received from the controller according to the obtained data for compensating the operation to the gantry main shaft 81.

When a superior controller of the panel tester 8 controls the gantry main shaft 81 and the gantry slave shaft 82 to operate, it can send control commands respectively to each of the slave devices 4, and each of the slave devices 4 can compensate the received control command according to the obtained data with respect to other slave device 4 in charge of another shaft. It can be seen from FIG. 7 that the operations of the gantry main shaft 81 and the gantry slave shaft 82 are synchronized, turns out smooth and consistent second main current I2*a* as well as second slave current I2*b* are generated. As shown in FIG. 7, the hand-shaking method of the present invention can ensure multiple slave devices 4 to reach optimized synchronization, so as to reduce unnecessary energy wasting and extend devices' lifetime.

As mentioned above, after obtaining the backup packet P4 by the packet diversion module 46, the slave device 4 may analyze the backup packet P4 through the designated data obtaining module 47, so as to filter out unnecessary content of the backup packet P4 (i.e., undesignated data) and keep only necessary content of the back packet P4 (i.e., designated data).

Figure 8:
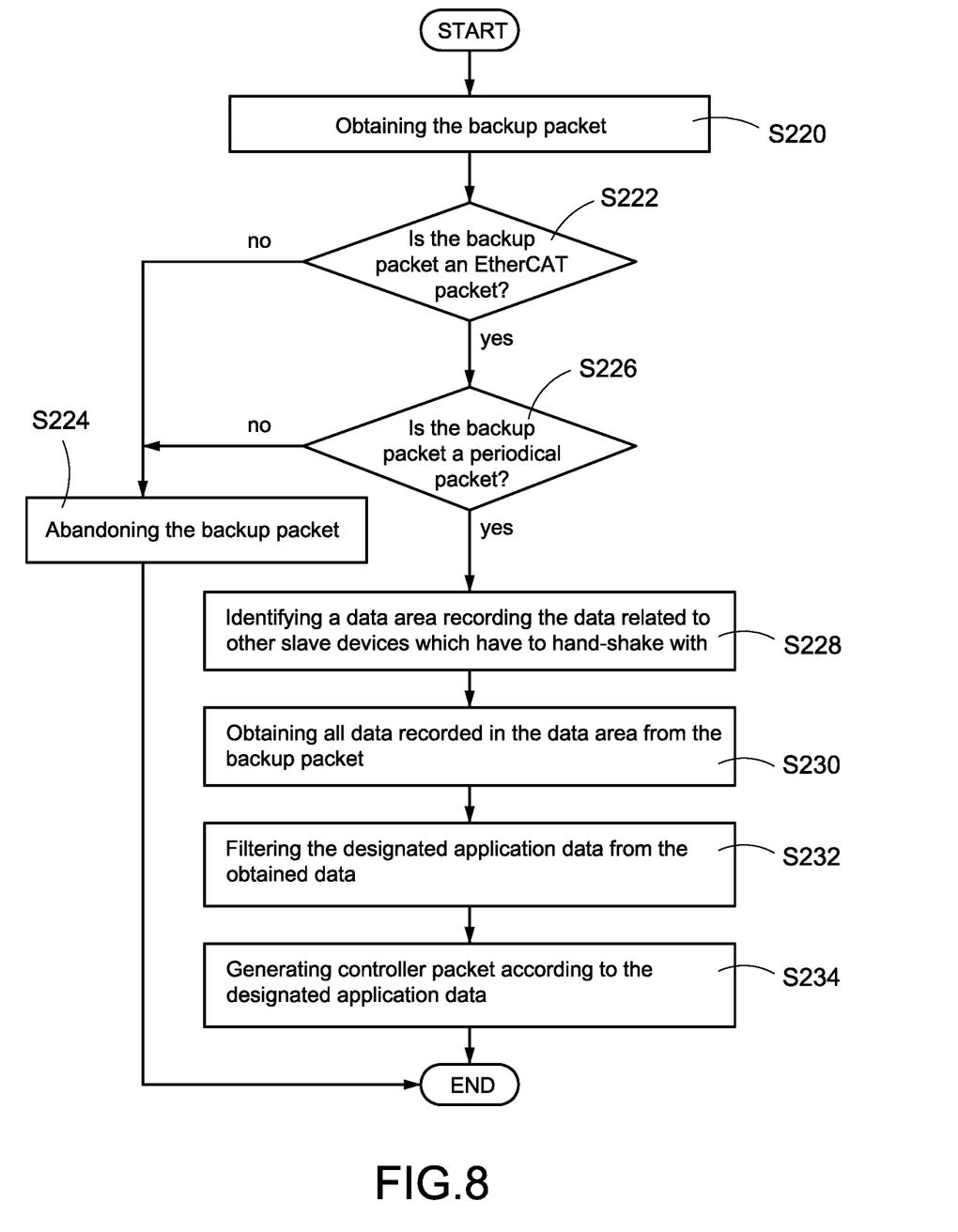
FIG. 8 is a packet processing flowchart according to a first embodiment of the present invention.

FIG. 8 is a packet processing flowchart according to a first embodiment of the present invention. FIG. 8 is provided here to detailed describe the step S22 as disclosed in FIG. 3, i.e., to describe how to analyze the backup packet P4 for filtering and obtaining necessary data.

First, the slave device 4 obtains the backup packet P4 generated by the packet diversion procedure (step S220), and then determines whether the backup packet P4 is an EtherCAT packet (step S222), i.e., the slave device 4 determines whether the backup packet P4 is a packet complying with format of EtherCAT protocol. If the backup packet P4 is not an EtherCAT packet, it will not include data of other slave devices 4 on the EtherCAT bus, so that the slave device 4 may directly abandon this backup packet P4 (step S224).

If the backup packet P4 is an EtherCAT packet, the slave device 4 further determines if the backup packet P4 is a periodical packet (step S226), i.e., if the foundation of the backup packet P4 (i.e., the data packet P1, the processed data packet P2 and the returned packet P3) are transmit within one single communication cycle. As discussed above, one of the purposes of the present invention is to make multiple slave devices 4 to directly obtain data with respect to other slave device 4 having cooperation relationship within one single communication cycle without sending additional command packet, so as to achieve optimized synchronization. According to this manner, if the backup packet P4 is not a periodical packet but a non-periodical packet, it may not be used for the present invention in accomplishing the above purpose, so the slave device 4 can also abandon this backup packet P4 (step S224).

In this embodiment, the step S222 and the step S226 do not have a specific execution order.

If the backup packet P4 is an EtherCAT packet and also a periodical packet, the slave device 4 may analyze this backup packet P4 according to a preset initial setting parameter (not shown) for obtaining therefrom the designated data with respect to one or more other slave devices 4 designated by a user (which is the slave device(s) 4 have to operate synchronously with this slave device 4).

When analyzing the backup Packet P4, the slave device 4 can confirm the identity, such as quality, number, position, etc., of one or more other slave devices 4 needed to hand-shaking with according to the content of the initial setting parameter, and identifies a data area used to record the data related to the other slave devices 4 in the backup packet P4 (step S228). Next, the slave device 4 obtains all data recorded in the data area from the backup packet P4 (step S230), and filters the designated application data indicated by the initial setting parameter from the obtained data (step S232). In one embodiment, the designated application data can be, but not limited to, position feedback data, speed feedback data, torque feedback data, etc.

After the step S232, the slave device 4 stores the obtained designated application data to the storage 52, or generates a controller packet P5 under a format requested by the ESC 41 according to the designated application data (step S234). When being activated to implement lower layer applications of the slave device 4 (such as controlling shafts of panel testers, CNC controllers or robots), the ESC 41 of the slave device 4 can perform optimized synchronization operation with other slave device(s) 4 having cooperation relationship according to the designated application data/controller packet P5, so as to reduce device's energy wasting and improve device' quality.

As the skilled person will appreciate, various changes and modifications can be made to the described embodiment. It is intended to include all such variations, modifications and equivalents which fall within the scope of the present invention, as defined in the accompanying claims.

What is claimed is:

1. A method for data hand-shaking based on EtherCAT (Ethernet for Control Automation Technology) protocol, implemented by an EtherCAT slave device having an EtherCAT slave controller (ESC), and comprising:
   a) receiving a data packet from a previous data processing device through a first receiving route;
   b) obtaining self-related data of the EtherCAT slave device from the data packet or inserting feedback data of the EtherCAT slave device to the data packet by the ESC for generating a processed data packet;
   c) delivering the processed data packet to a next slave device through a first transmission route;
   d) receiving a returned packet from the next slave device through a second receiving route, and delivering the returned packet to the previous data processing device through a second transmission route;
   e) performing a packet diversion procedure to at least one of the data packet, the processed data packet and the returned packet for generating a backup packet, wherein at least a part of the content of the backup packet is identical to the content of the data packet, the processed data packet or the returned packet; and
   f) analyzing the backup packet by the ESC for filtering and obtaining a related data from the backup packet, wherein the related data is a designated application data with respect to at least one of other EtherCAT slave devices designated to be synchronized with the EtherCAT slave device,
   wherein the step a) to the step f) are completed within one single communication cycle.

2. The method for data hand-shaking based on EtherCAT protocol in claim 1, wherein the EtherCAT slave device further comprises an input port and an output port, the first receiving route comprises a first receiving circuit in the EtherCAT slave device and a first connection circuit between the EtherCAT slave device and the previous data processing device, the first transmission route comprises a first transmission circuit in the EtherCAT slave device and a second connection circuit between the EtherCAT slave device and the next slave device, the second receiving route comprises a second receiving circuit in the EtherCAT slave device and a third connection circuit between the EtherCAT slave device and the next slave device, the second transmission route comprises a second transmission circuit in the EtherCAT slave device and a fourth connection circuit between the EtherCAT slave device and the previous data processing device, wherein the ESC is connected to the input port through the first receiving circuit for receiving the data packet, connected to the output port through the first transmission circuit for delivering the processed data packet, connected to the output port through the second receiving circuit for receiving the returned packet, and connected to the input port through the second transmission circuit for delivering the returned packet, wherein the step e) is to perform the packet diversion procedure for generating the backup packet through a packet diversion module arranged on the first receiving circuit, the first transmission circuit, the second receiving circuit or the second transmission circuit.

3. The method for data hand-shaking based on EtherCAT protocol in claim 2, wherein the ESC comprises a first media access control (MAC) unit and a second MAC unit, the packet diversion module comprises a third MAC unit, the packet diversion procedure is to deliver the data packet to the first MAC unit and the third MAC unit simultaneously through the input port and the first receiving circuit, to deliver the processed data packet by the second MAC unit to an address used by the next slave device and the third MAC unit simultaneously through the first transmission circuit, to deliver the returned packet to the second MAC unit and the third MAC unit simultaneously through the output port and the second receiving circuit, or to deliver the returned packet by the first MAC unit to an address used by the previous data processing device and the third MAC unit simultaneously through the second transmission circuit.

4. The method for data hand-shaking based on EtherCAT protocol in claim 2, wherein the step e) is to duplicate the data packet, the processed data packet or the returned packet, and to store the same to a storage of the EtherCAT slave device for generating the backup packet by the packet diversion module.

5. The method for data hand-shaking based on EtherCAT protocol in claim 1, wherein the previous data processing device is an EtherCAT master device or other EtherCAT slave device.

6. The method for data hand-shaking based on EtherCAT protocol in claim 1, wherein the EtherCAT slave device is implemented by a field programmable gate array (FPGA), an application specific integrated circuit (ASIC) or a microcontroller unit (MCU).

7. The method for data hand-shaking based on EtherCAT protocol in claim 1, wherein the step f) comprises:
   f1) obtaining the backup packet;
   f2) determining whether the backup packet is an EtherCAT packet;
   f3) determining whether the backup packet is a periodical packet;
   f4) abandoning the backup packet if the backup packet is not the EtherCAT packet or the periodical packet; and f5) analyzing the backup packet if the backup packet is determined as both the EtherCAT packet and the periodical packet.

8. The method for data hand-shaking based on EtherCAT protocol in claim 7, further comprises:

f6) determining a data area for recording data related to other slave device is needed to hand-shake with the EtherCAT slave device;

f7) obtaining all data recorded in the data area from the backup packet; and f8) filtering the designated application data from obtained data.

9. The method for data hand-shaking based on EtherCAT protocol in claim 8, wherein the EtherCAT slave device is applied in a server driver, the designated application data at least comprises position feedback data, speed feedback data or torque feedback data with respect to other slave device.

10. The method for data hand-shaking based on EtherCAT protocol in claim 1, wherein the EtherCAT slave device further comprises an input port and an output port connected with the ESC, the input port is connected to the previous data processing device through a first connection circuit, the output port is connected to the next slave device through a second connection circuit, the step e) is to perform the packet diversion procedure for generating the backup packet by a packet diversion processor arranged on the first connection circuit or the second connection circuit.

\* \* \* \* \*